United States Patent
Hirsch et al.

(10) Patent No.: US 11,700,846 B2
(45) Date of Patent: *Jul. 18, 2023

(54) INSECTICIDE DISPENSING DEVICE AND METHOD

(71) Applicants: Jeremy Eli Hirsch, Hattiesbur, MS (US); Christopher Michael Bonner, Hattiesburg, MS (US)

(72) Inventors: Jeremy Eli Hirsch, Hattiesbur, MS (US); Christopher Michael Bonner, Hattiesburg, MS (US)

(*) Notice: Subject to any disclaimer, the term of this patent is extended or adjusted under 35 U.S.C. 154(b) by 235 days.

This patent is subject to a terminal disclaimer.

(21) Appl. No.: 16/928,264

(22) Filed: Jul. 14, 2020

(65) Prior Publication Data

US 2020/0337292 A1    Oct. 29, 2020

Related U.S. Application Data

(63) Continuation of application No. 15/646,954, filed on Jul. 11, 2017, now Pat. No. 10,750,735.

(60) Provisional application No. 62/361,054, filed on Jul. 12, 2016.

(51) Int. Cl.
  *A01M 13/00*    (2006.01)
  *A01M 1/20*    (2006.01)
  *A01N 25/00*    (2006.01)

(52) U.S. Cl.
  CPC ........ *A01M 13/003* (2013.01); *A01M 1/2016* (2013.01); *A01N 25/006* (2013.01)

(58) Field of Classification Search
  CPC .. A01M 13/003; A01M 1/2006; A01N 25/003
  USPC .......................................................... 43/125
  See application file for complete search history.

(56) References Cited

U.S. PATENT DOCUMENTS

| | | |
|---|---|---|
| 2,767,511 A | 10/1956 | Kissner et al. |
| 4,328,636 A | 5/1982 | Johnson |
| 4,442,624 A | 4/1984 | Browne |
| 4,718,193 A | 1/1988 | Rosselli |
| 4,849,216 A | 7/1989 | Andersen |
| 5,189,831 A | 3/1993 | Miller et al. |
| 5,413,784 A | 5/1995 | Wright et al. |
| 5,452,540 A | 9/1995 | Dowd et al. |

(Continued)

FOREIGN PATENT DOCUMENTS

| | | |
|---|---|---|
| CN | 1049824 | 3/1991 |
| CN | 105165761 | 12/2015 |

(Continued)

OTHER PUBLICATIONS

Chilean Office Action cited in Application No. 202000514 dated Sep. 29, 2021.

(Continued)

*Primary Examiner* — Christopher P Ellis
(74) *Attorney, Agent, or Firm* — DLA Piper LLP (US)

(57) ABSTRACT

Insecticide dispensing devices and methods of the present technology provide for the prolonged release of insecticide for the eradication of insect populations. Insecticide dispensing devices include an attractive toxic sugar bait, and have a housing configured with at least one aperture to allow a gaseous compound to exit the internal cavity and sized to allow entry of a target insect into the internal cavity. Methods of insecticide dispensing include activating the attractive toxic sugar bait in the device, and placing the activated device in an area where insects are present.

18 Claims, 4 Drawing Sheets

(56) References Cited

U.S. PATENT DOCUMENTS

| | | |
|---|---|---|
| 5,540,011 A | 7/1996 | Groom et al. |
| 5,749,168 A | 5/1998 | Chrysanthis |
| 6,189,259 B1 | 2/2001 | Soller |
| 6,209,256 B1 | 4/2001 | Brittin et al. |
| 6,425,202 B1 | 7/2002 | Lin et al. |
| 6,886,293 B2 | 5/2005 | Forehand |
| 6,978,572 B1 | 12/2005 | Bernklau et al. |
| 7,694,456 B1 | 4/2010 | Curtis |
| 9,192,151 B2 | 11/2015 | Koehler et al. |
| 9,603,351 B1 | 3/2017 | Terrell |
| 10,750,735 B2 | 8/2020 | Hirsch et al. |
| 2004/0001870 A1 | 1/2004 | Durand et al. |
| 2004/0057976 A1 | 3/2004 | Warner et al. |
| 2004/0128903 A1 | 7/2004 | Wexler |
| 2005/0011110 A1 | 1/2005 | Lin |
| 2006/0236592 A1 | 10/2006 | Hall, Jr. |
| 2009/0274644 A1 | 11/2009 | Rees |
| 2012/0204475 A1 | 8/2012 | Schneidmiller et al. |
| 2012/0246998 A1 | 10/2012 | Vasudeva et al. |
| 2012/0285076 A1 | 11/2012 | Banfield |
| 2013/0067795 A1 | 3/2013 | Wesson et al. |
| 2013/0247451 A1 | 9/2013 | Vanhercke et al. |
| 2013/0303574 A1 | 11/2013 | Gaugler et al. |
| 2014/0100175 A1 | 4/2014 | Ford et al. |
| 2014/0173971 A1 | 6/2014 | Boyd et al. |
| 2016/0007585 A1 | 1/2016 | Jany et al. |
| 2016/0157496 A1 | 6/2016 | Nchekwube |
| 2016/0242403 A1 | 8/2016 | Gaugler et al. |
| 2016/0270393 A1 | 9/2016 | Takken et al. |
| 2016/0366870 A1 | 12/2016 | Leier et al. |
| 2017/0000101 A1 | 1/2017 | Gaugler et al. |
| 2017/0105402 A1 | 4/2017 | Koehler et al. |
| 2017/0208793 A1 | 7/2017 | Choe et al. |
| 2017/0208797 A1 | 7/2017 | Murray et al. |
| 2018/0014526 A1 | 1/2018 | Hirsch et al. |
| 2018/0092344 A1 | 4/2018 | Tyler |
| 2018/0184634 A1 | 7/2018 | DiMeo et al. |
| 2018/0213765 A1 | 8/2018 | Liang |
| 2018/0325109 A1 | 11/2018 | Mafra-Neto et al. |
| 2019/0014769 A1 | 1/2019 | Itano et al. |

FOREIGN PATENT DOCUMENTS

| | | |
|---|---|---|
| CN | 105494298 | 4/2016 |
| CN | 108094389 | 6/2018 |
| FR | 2 614 507 | 11/1988 |
| JP | 2003164246 | 6/2003 |
| KR | 2008/0097860 | 11/2008 |
| WO | WO 93/22909 | 11/1993 |
| WO | WO 0132013 | 5/2001 |
| WO | WO 02/102145 | 12/2002 |
| WO | WO 2012/158192 | 11/2012 |
| WO | WO 2015/013110 | 1/2015 |
| WO | WO 2020/102145 | 5/2020 |

OTHER PUBLICATIONS

Partial Translation of Chilean Search Report cited in Application No. 202000514 dated Sep. 29, 2021.
El Salvador Office Action cited in Application No. 20006044 dated Aug. 19, 2021.
English Translation of El Salvador Office Action cited in Application No. 20006044 dated Aug. 19, 2021.
Columbian Office Action cited in Application No. NC 2020/0002270 dated Nov. 25, 2021.
African Notice of Allowance cited in Application No. AP/P/2018/010810 dated Nov. 16, 2021.
Partial English Abstract for CL 2007003242 published Feb. 8, 2008.
Partial English Abstract for CL 2009000801 published Feb. 5, 2010.
Indian Examination Report cited in Application No. 201817014214 dated Dec. 8, 2020.
U.S. Appl. No. 15/646,954, US 2018/0014526, filed Jan. 18, 2018, U.S. Pat. No. 10,750,735.
U.S. Appl. No. 16/811,749, US 2020-0281180, filed Sep. 10, 2020, Pending.
Video, archived at https://www.youtube.com/watch?v=FvJPppi1cAU (retrieved Nov. 2, 2021).
European Search Report cited in Application No. 201612645.5-1004 dated Feb. 1, 2021.
File History of U.S. Appl. No. 16/811,749.
Brazilian Office Action cited in Application No. BR112018011547-9 dated Jun. 1, 2021.
Thailand Office Action in Application No. 1801002283 dated Mar. 25, 2019.
E. E. Revay, "Control of Aedes albopictus with attractive toxic sugar baits (ATSB) and potential impact on non-target organisms in St. Augustine, FL", Parasitol Res., vol. 113, pp. 73-79, (2014).
K. Khallaayoune, et al., "Attractive Toxic Sugar Baits: Control of Mosquitoes With the Low-Risk Active Ingredient Dinotefuran and Potential Impacts on Nontraget Organisms in Morocco", Environmental Entomology, 42(5), pp. 7, (2013).
D. P. Naranjo, et al., "Evaluation of boric acid sugar baits against Aedes albopictus (Diptera: Culicidae) in tropical environments", Parasitol Res, vol. 112, pp. 1583-1597, (2013).
A. Ali, et al., "Effects of Sublethal Exposure to Boric Acid Sugar Bait on Adult Survival, Host-Seeking, Bloodfeeding Behavior, and reproduction of Stegomyia Albopicta", pp. 464-468, vol. 22(3), (2006).
G. Mueller, et al.,"Successful field trial of attractive toxic sugar bait (ATSB) plant-spraying methods against malaria vectors in the Anopheles gambiae complex in Mali, West Africa", Malaria Journal, pp. 7, (2010).
F. Wang, et al., "Control of male Aedes albopictus Skuse (Diptera: Culicidae) using boric acid sugar ait and its impact on female fecundity and fertility", Journal of Vector Ecology, pp. 203-206, vol. 42, No. 1, (Jun. 2017).
G. C. Muller, et al., et al., "Field experiments of Anopheles gambiae attraction to local fruits/seedpods and flowering plants in Mali to otimize strategies for malaria vector control in Africa using attractive toxic sugar bait methods", Malaria Journal, pp. 1-11, (2010).
Y. Schlein, et al., "Diurnal resting behavior of adult Culex pipiens in an arid habitat in Israel and possible control measurements with toxic sugar baits", Acta Tropica, 124, pp. 48-53, (2012).
J. C. Beier, et al., "Attractive toxic sugar bait (ATSB) methods decimate populations of Anopheles malaria vectors in arid environments regardless of the local availability of favoured sugar-source blossoms", Malaria Journal, pp. 7, (2012).
A. Junnila, et al., "Efficacy of attractive toxic sugar baits (ATSB) against Aedes albopictus with garlic oil encapsulated in beta-cyclodextrin as the active ingredient", Acta Tropica, 152, pp. 195-200, (2015).
G. C. Muller, "Seed pods of the carob tree *Ceratonia silique* are a favored sugar source for the mosquito *Aedes albopictus* in coastal Israel", Acta Tropica, 118, pp. 135-239, (2010).
L. C. Bahmi, et al., "Boric acid ovicidal trap for the management of *Aedes* species", J. Vector Borne Dis., 52, pp. 147-152, (Jun. 2015).
Z. P. Stewart, "Indoor Application of Attractive Toxic Sugar Bait (ATSB) in Combination with Mosquito Nets for Control of Pyrethroid-Resistant Mosquitoes", PLOS ONE, vol. 8, Issue 12, pp. 1-7, (Dec. 2013).
T. T. Hossain, et al., "Evaluation of Boric Acid Sugar Baits Sprayed on Plants Against the Salt Marsh Mosquito, *Aedes taeniorhynchus* (Dipstera: Culicidae)", Florida Entomologist 97(4), pp. 1867-1870, (Dec. 2014).
Yan-Mei Ding, et al.; "Laboratory evaluation of differential attraction of Culex pipiens pallens to fruit-based sugar baits", Acta Tropica, 163; pp. 20-25, (2016).
J. Chad Gore, et al., "Laboratory Evaluation of Boric Acid-Sugar Solutions as Baits for Management of German Cockroach Infestations", Journal of Economic Entomogoly, vol. 97, No. 2, pp. 581-587; (2004).
J. Marshall, et al., "Quantifying the mosquito's sweet tooth: modelling the effectiveness of attractive toxic sugar baits (ATSB) for malaria vector control", Malaria Journal, pp. 1-13, (2013).

(56) References Cited

OTHER PUBLICATIONS

L. McPhatter, et al., "Effect of $CO_2$ concentration on mosquito collection rate using odor-baited suction traps", Journal of Vector Ecology, pp. 44-50, (Jun. 2017).
W. A. Qualls, et al., "Evaluation of attractive toxic sugar bait (ATSB)—Barrier for control of vector and nuisance mosquitoes and its effect on non-target organisms in sub-tropical environments in Florida", Acta Tropica, pp. 104-110, (2014).
W. A. Qualls, et al., "Evaluation and Adaption of Attractive Toxic Sugar Baits for Culex tarsalis and Culex quinquefasciatus Control in the Coachella Valley, Southern California", Journal of the American Mosquito Control Association, Inc., pp. 292-299, (2016).
E. E. Revay, "Formulation of attractive toxic sugar bait (ATSB) with safe EPA-exempt substance significantly diminishes the Anopheles sergentii population in a desert oasis", Acta Tropica, pp. 29-34, (2015).
G. E. Rivera, "Developing a Novel Attractive Toxic Sugar Bait (ATSB) Device for Intra-domiciliary Controld of Aedes aegypti", pp. 30, (2016).
P. F. Zermoglio, et al., "What does heat tell a mosquito? Characterization of the orientation behavior of Aedes aegypti towards heat sources", Journal of Insect Physiology, pp. 9-14, (2017).
G. C. Muller, et al., "Differential attraction of Aedes albopictus in the field to flowers, fruits and honeydew", Acta Tropica, pp. 45-49, (2011).
International Search Report and Written Opinion from PCT/US2017/041546 dated Oct. 7, 2017.
El Salvador Office Action cited in Application No. 5670.18 dated Sep. 30, 2019.
Written Opinion cited in Application No. PCT/us20/021446 dated May 22, 2020.
International Search report cited in Application No. PCT/us20/021446 dated May 22, 2020.
Costa Rican Office Action cited in Application No. 2018-0000257 dated Jan. 13, 2022.
European Examination Report cited in Application No. 17 828 311.5-1004 dated Feb. 9, 2022.
Mexican Office Action cited in Application No. MX/a/2018/005996 dated Apr. 25, 2022.
Columbian Office Action cited in Application No. NC2020/0002270 dated Apr. 29, 2022.
English Translation of Columbian Office Action cited in Application No. NC2020/0002270 dated Apr. 29, 2022.
Brazilian Office Action cited in Application No. BR112018011547-9 dated Jun. 27, 2022.
English Translation of Brazilian Office Action cited in Application No. BR112018011547-9 dated Jun. 27, 2022.
Australian Examination Report cited in application No. 2017297358 dated Jul. 14, 2022.
Panama Search Report cited in Application No. 92116-01 dated Nov. 21, 2021.
Israel Office Action issued in Application P-593578-IL dated Dec. 15, 2022.
Costa Rican Office Action cited in Application No. 2018-0000257 dated Mar. 3, 2023.
Partial English Abstract for JP 2003-164246 published on Jun. 10, 2003.
Partial English Abstract for CN 1049824 published on Mar. 13, 1991.
Partial English Abstract for CN 105165761 published on Dec. 23, 2015.
Mexican Notice of Allowance cited in Application No. MX/a/2018/005996 dated Apr. 28, 2023.
Partial Translation of Mexican Notice of Allowance cited in Application No. MX/a/2018/005996 dated Apr. 28, 2023.

INSECTICIDE DISPENSING DEVICE AND METHOD

RELATED APPLICATIONS

This application is a continuation of U.S. application Ser. No. 15/646,954 filed Jul. 11, 2017, which claims priority to U.S. Provisional Application Ser. No. 62/361,054, filed on Jul. 12, 2016, the disclosure of which is hereby incorporated by reference in its entirety.

BRIEF SUMMARY

The present invention relates to insect eradication, and more particularly to a device and method for the dispensing insecticide.

BRIEF DESCRIPTION OF SEVERAL VIEWS OF THE DRAWINGS

Specific examples have been chosen for purposes of illustration and description, and are shown in the accompanying drawings, forming a part of the specification.

DETAILED DESCRIPTION

Insecticide dispensing devices and methods of the present technology provide for the prolonged release of insecticide for the eradication of insect populations.

Figure 1:
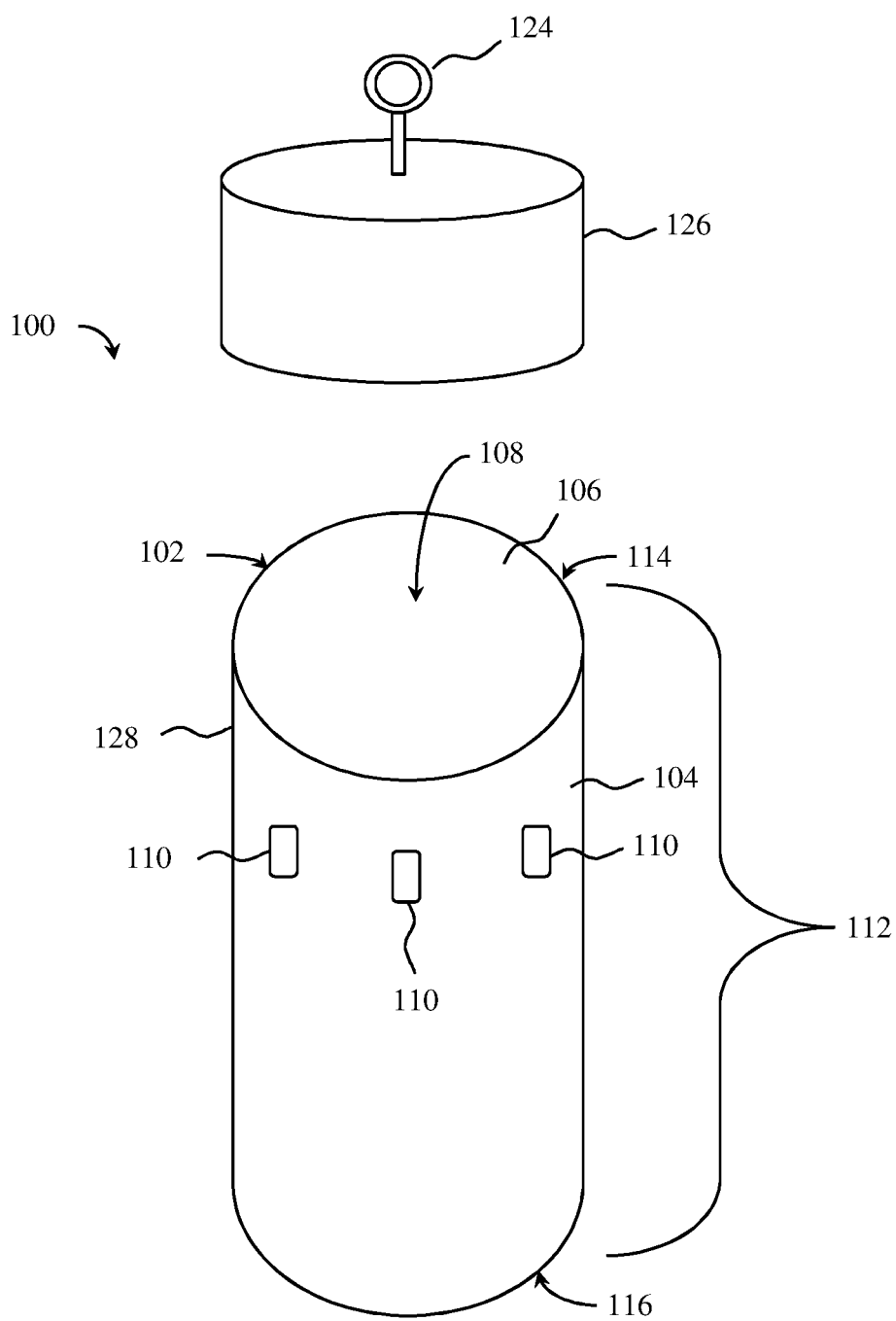
FIG. 1 illustrates one example of an insecticide distribution device of the present technology.
Figure 2:
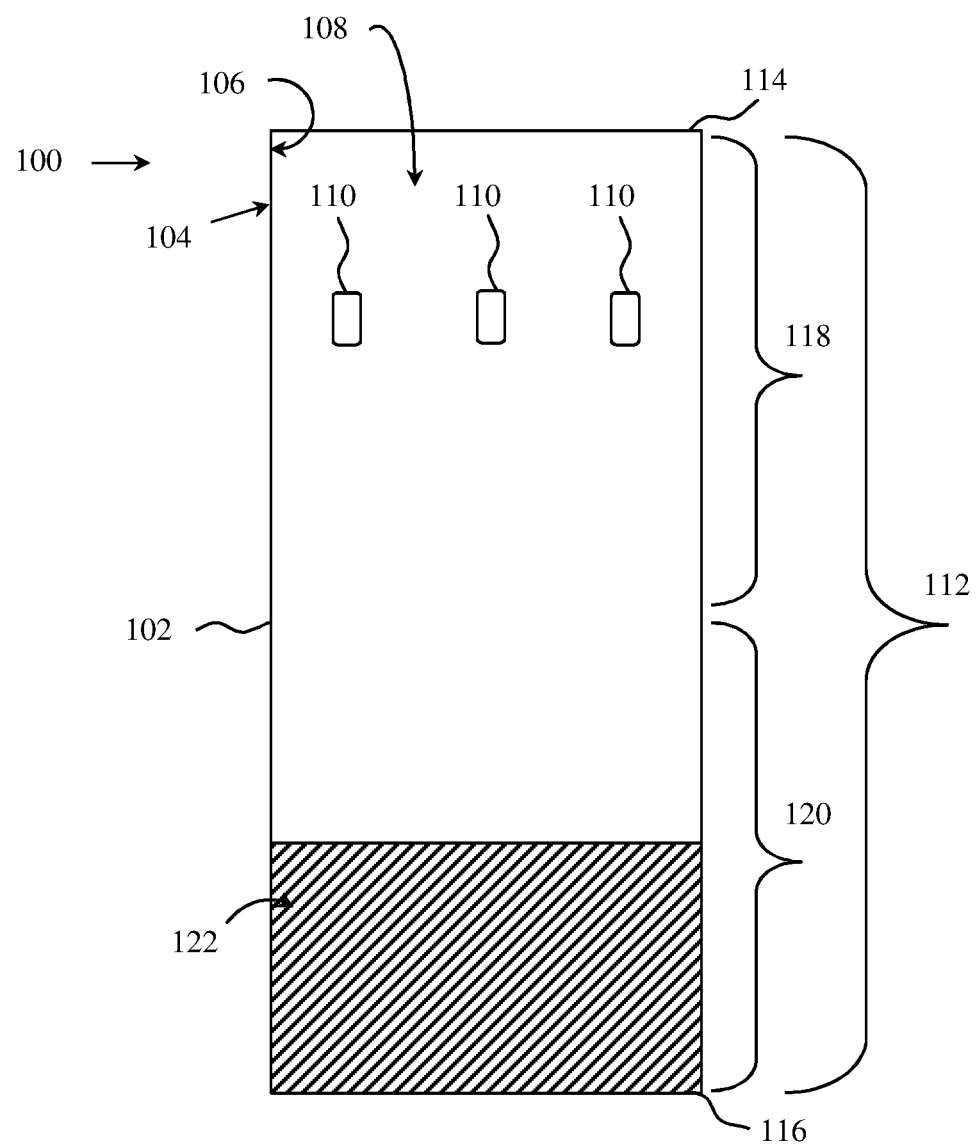
FIG. 2 is a cross-section of the insecticide distribution device of FIG. 1.

One example of an insecticide dispensing device 100 of the present technology is shown in FIGS. 1-2. FIG. 1 is a perspective view of the device, while FIG. 2 shown a cross-section thereof. The insecticide dispensing device 100 may be made of any suitable material, such as PVC or plastic. As can be seen, the insecticide dispensing device 100 includes a housing 102. The housing 102 has an outer surface 104 and an inner surface 106 that defines an internal cavity 108. The internal cavity may have any suitable volume, including a volume of at least about 450 milliliters. The device 100 also includes at least one aperture 110 in the housing that extends from the outer surface 104 to the inner surface 106 and forms a pathway from the internal cavity 108 out of the housing 102. As shown in FIG. 1-2, the device 100 has a plurality of apertures 110 in the housing 102 that each extend from the outer surface 102 to the inner surface 104 and form a pathway from the internal cavity 108 out of the housing 102.

As can be seen in FIG. 2, the insecticide dispensing device 100 also includes an attractive toxic sugar bait 122. The attractive toxic sugar bait includes an insecticide agent, which may be selected to be effective to kill members of the target insect population. The attractive toxic sugar bait may have any suitable formulation to be effective. In at least some examples, the attractive toxic sugar bait may be in the form of a solid. In such examples, a user may activate the attractive toxic sugar bait by adding water thereto, to form a solution. The attractive toxic sugar bait solution may undergo fermentation when activated by the water. The insecticide agent may be present in an amount from about 0.05% by weight to about 5% by weight of the attractive toxic sugar bait solution. As the attractive toxic sugar bait may undergoes fermentation, it may release a gaseous compound, such as carbon dioxide. In such examples, the attractive toxic sugar bait may include yeast and sugar. It may be necessary for the water added by the user to have a sufficiently warm temperature, such as at least 70° F., to activate the fermentation process. The attractive toxic sugar bait may further include additional ingredients, such as a lipid, which may promote the fermentation reaction and/or the attraction of the target insect to the bait.

One example formulation for an attractive toxic sugar bait of the present technology is:

| | |
|---|---|
| 209.4 g | Sucrose |
| 17.4 g | Orthoboric Acid, |
| 2.47441 g | Brewer's Yeast, |
| .1 mg | Thiamin, |
| .12 mg | Riboflavin, |
| .8 mg | Niacin, |
| .07 mg | Vitamin B6, |
| 4.9 mcg | Folate, |
| .02 mcg | Vitamin B12, |
| .05 mg | Pantothenic Acid, |
| 1.3 g | Protein, |
| 2.6 g | Magnesium, |
| .09 mg | Iron, |
| 52 mg | Potassium, |
| 5.2 mg | Sodium, |
| .12 mg | Zinc, |
| .08 mg | Copper, |
| 5.2 mcg | Selenium, |
| 1.1 g | Carbohydrates, |
| .01 g | Biotin, |
| .005 g | Lipids |

Referring back to FIGS. 1-2, the housing has a vertical length 112 having a top end 114 and a bottom end 116. As can be seen in FIG. 2, the device 100 has an upper portion 118 that includes the top end 114 of the length 112, and a lower portion 120 that includes a bottom end 116 of the length. The attractive toxic sugar bait 122 may be contained in the internal cavity 108, within the lower portion 120 of the housing 102. In at least some examples, each of the apertures is located in the upper portion 118 of the housing 102. However, in other examples, at least one aperture may be located in the lower portion 120 of the housing, although the at least one aperture should be located so that it does not result in leakage of the attractive toxic sugar bait from the device.

Each aperture 110 is be located in such a manner as to allow a gaseous compound, such as carbon dioxide produced by the attractive toxic sugar bait once it is activated, to exit the internal cavity 108. Each aperture 110 is also located and sized to allow a target insect to access (and consume) the attractive toxic sugared bait. In some examples, the at least one aperture 110 is sized to allow the target insect to enter into the internal cavity to access the attractive toxic sugar bait. While the insecticide dispensing devices of the present technology may be useful to dispense insecticide to various types of insects, the target insect for at least some examples may be a mosquito. In such examples, the at least one aperture 110 may have a diameter of up to about ¼ inches, or from about 1/16 inches to about 3/16 inches. The apertures may all be the same size, or have different sizes. However, the size of each aperture should be selected to allow the mosquito to feed from the attractive toxic sugar bait in the device, while preventing other insects, such as honeybees, and animals, such as hummingbirds, to access and feed from the attractive toxic sugar bait.

Figure 3:
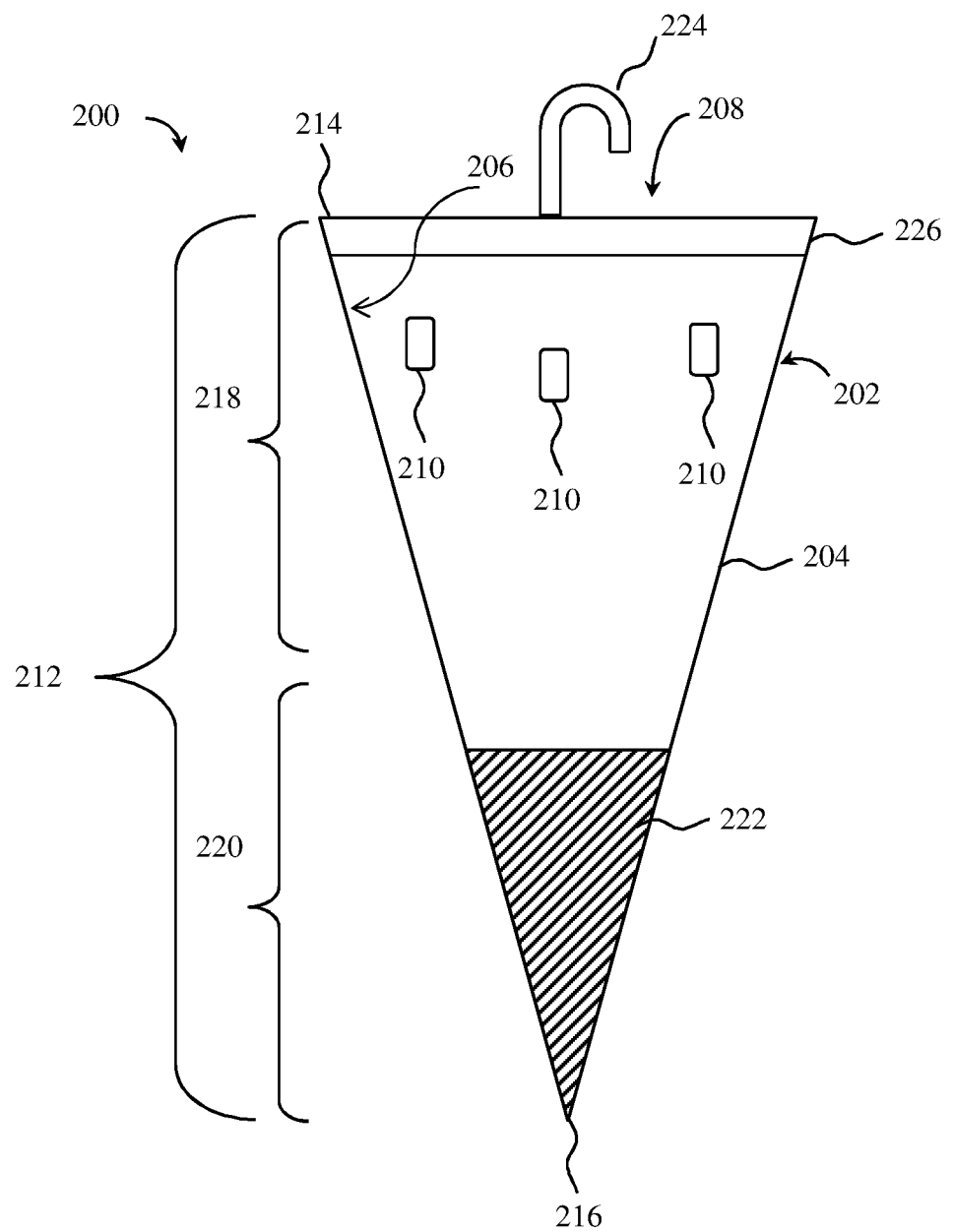
FIG. 3 illustrates a second example of an insecticide distribution device of the present technology.

FIG. 3 illustrates a second example of an insecticide dispensing devices of the present technology. The insecticide dispensing device 200 may be made of any suitable material, including plastic, and may take the form of a plastic bag. As can be seen, the insecticide dispensing device 200 includes a housing 202. The housing 202 has an outer surface 204 and an inner surface 206 that defines an internal cavity 208. The internal cavity 208 may have any suitable volume, including a volume of at least about 450 milliliters. The device 200 also includes at least one aperture 210 in the housing 202 that extends from the outer surface 204 to the inner surface 206 and forms a pathway from the internal cavity 208 out of the housing 202. As shown in FIG. 3, the device 200 has a plurality of apertures 210 in the housing 202 that each extend from the outer surface 202 to the inner surface 204 and form a pathway from the internal cavity 208 out of the housing 202.

As can be seen in FIG. 3, the insecticide dispensing device 200 also includes an attractive toxic sugar bait 122.

Additionally, the housing 202 has a vertical length 212 having a top end 214 and a bottom end 216. As can be seen in FIG. 3, the device 200 has an upper portion 218 that includes the top end 214 of the length 212, and a lower portion 220 that includes a bottom end 216 of the length. The attractive toxic sugar bait 222 may be contained in the internal cavity 208, within the lower portion 220 of the housing 202. In at least some examples, each of the apertures is located in the upper portion 218 of the housing 202. However, in other examples, at least one aperture 210 may be located in the lower portion 220 of the housing, although the at least one aperture 210 should be located so that it does not result in leakage of the attractive toxic sugar bait from the device.

Each aperture 210 is located in such a manner as to allow a gaseous compound, such as carbon dioxide produced by the attractive toxic sugar bait once it is activated, to exit the internal cavity 208. Each aperture 210 is also located and sized to allow a target insect to access (and consume) the attractive toxic sugared bait. In some examples, the at least one aperture 210 is sized to allow the target insect to enter into the internal cavity to access the attractive toxic sugar bait. As discussed above with respect to device 100, the target insect for device 200 may be a mosquito. In such examples, the at least one aperture 210 may have a diameter of up to about ¼ inches, or from about ¹⁄₁₆ inches to about ³⁄₁₆ inches. The apertures may all be the same size, or have different sizes. However, the size of each aperture should be selected to allow the mosquito to feed from the attractive toxic sugar bait in the device, while preventing other insects, such as honeybees, and animals, such as hummingbirds, to access and feed from the attractive toxic sugar bait.

Insecticide dispensing devices of the present technology may include at least one mounting fixture 124, 224 attached to the housing 102, 202 and configured to allow the device to be mounted vertically or substantially vertically. Examples of suitable mounting fixtures include eyelet hook 124 (FIG. 1), and hook 224 (FIG. 3). Other suitable mounting fixtures include other types of hooks, support straps, hook and loop fasteners, and the like.

Insecticide dispensing devices of the present technology may include at least one resealable sealing closure, which can be opened to allow access to the internal cavity and closed to seal or reseal the device 100, 200. Examples of resealable sealing closures include cap 126 (FIG. 1) and resealable adhesive strip 26 (FIG. 3). Cap 126 may attach to the body 128 of the housing 102 by snap fit, friction fit, threaded closure, or any other suitable resealable closing mechanism. Other examples of suitable resealable sealing closures include ties, zipper closures, and the like. In some examples, such as a modified version of device 100, the device may include a plurality of resealable sealing closures, such as having a resealable sealing closure at each end.

Figure 4:
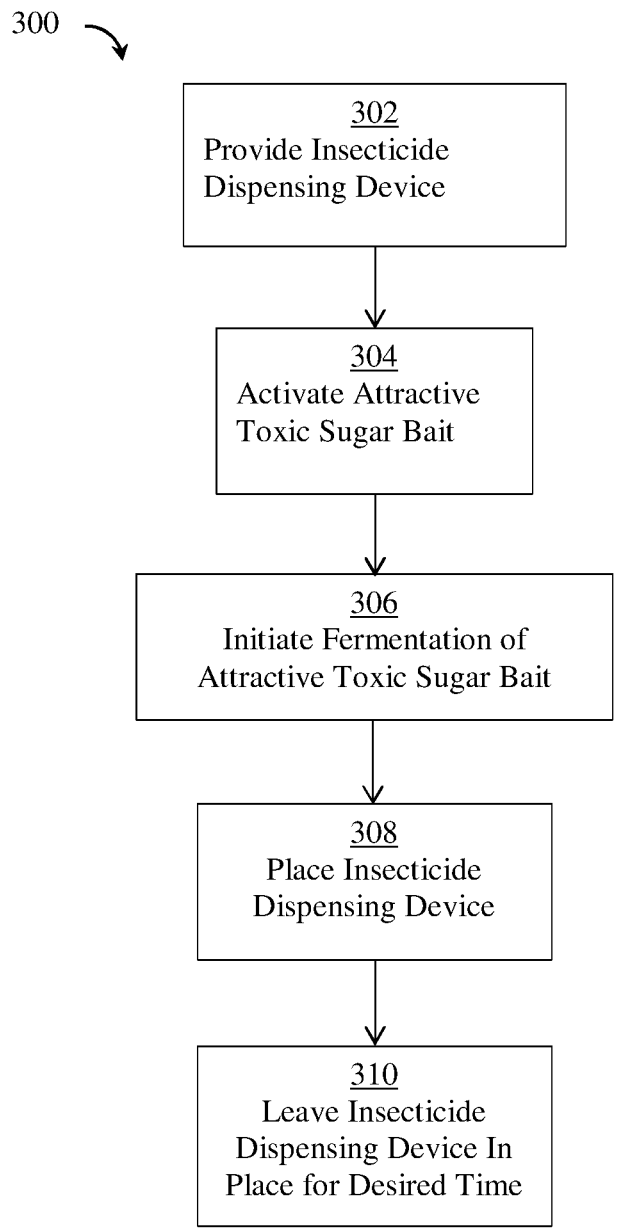
FIG. 4 is a flow chart of a method of distributing insecticide of the present technology.

FIG. 4 is a flow chart describing an example of a method 300 of dispensing insecticide of the present technology. Method 300 starts at step 302, with providing an insecticide dispensing device. The insecticide dispensing device may be an insecticide dispensing device of the present technology, as described above with respect to devices 100 and 200. Accordingly, the insecticide dispensing device may include a housing that has an outer surface and an inner surface that defines an internal cavity. The insecticide dispensing device may also include at least one aperture in the housing that extends from the outer surface to the inner surface and forms a pathway from the internal cavity out of the housing, the at least one aperture being located to allow a gaseous compound to exit the internal cavity and sized to allow entry of a target insect into the internal cavity. The insecticide dispensing device may further include an attractive toxic sugar bait including an insecticide agent, the attractive toxic sugar bait being contained within a portion of the internal cavity. Step 304 of the method 300 includes activating the attractive toxic sugar bait by adding a quantity of water to the insecticide dispensing device. In some examples, the step 304 of activating further includes step 306, which is initiating a fermentation reaction. The fermentation reaction causes the attractive toxic sugar bait to release a gaseous compound, such as carbon dioxide. In some examples, the water must be a sufficiently warm temperature, such as at least about 70° F., to activate the bait and initiate the fermentation reaction. The method 300 further includes a step 308 of placing the insecticide dispensing device in an area where insects are present. It is recommended that the insecticide dispensing device be placed in a vertical or substantially vertical orientation, to avoid leakage of the attractive toxic sugar bait from the device. The placing can include hanging the device, or mounting it on a tree, wall, or other surface. The method 300 can also include a step 310 of leaving the insecticide dispensing device in place for a desired time period, such as up to about 90 days.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. An insecticide dispensing device comprising:
   a housing including an outer surface and an inner surface that defines an internal cavity, the housing including a cap;
   an attractive toxic sugar bait; and
   at least one aperture in the housing that extends from the outer surface to the inner surface and forms a pathway from the internal cavity out of the housing, the at least one aperture being located to allow a gaseous compound to exit the internal cavity and sized to allow a target insect to access the attractive toxic sugar bait.

2. The insecticide dispensing device of claim 1, the device comprising a plurality of apertures in the housing that each extend from the outer surface to the inner surface and form a pathway from the internal cavity out of the housing, each aperture being located to allow gaseous compounds to exit the internal cavity and sized to allow entry of a target insect into the internal cavity.

3. The insecticide dispensing device of claim 1, wherein the housing further includes a vertical length, an upper portion that includes a top end of the length, and a lower portion that includes a bottom end of the length.

4. The insecticide dispensing device of claim 3, wherein the at least one aperture is located in the upper portion of the housing.

5. The insecticide dispensing device of claim 3, wherein the attractive toxic sugar bait is contained in the lower portion of the housing.

6. The insecticide dispensing device of claim 1, wherein the at least one aperture has a diameter of up to about ¼ inches.

7. The insecticide dispensing device of claim 1, wherein the at least one aperture has a diameter from about 1/16 inches to about 3/16 inches.

8. The insecticide dispensing device of claim 1, further comprising at least one mounting fixture attached to the housing and configured to allow the device to be mounted vertically or substantially vertically.

9. The insecticide dispensing device of claim 1, wherein the device further comprises a resealable sealing closure.

10. The insecticide dispensing device of claim 1, wherein the internal cavity has a volume of at least about 450 milliliters.

11. The insecticide dispensing device of claim 1, wherein the attractive toxic sugar bait further comprises yeast and sugar.

12. The insecticide dispensing device of claim 11, wherein the attractive toxic sugar bait further comprises a lipid.

13. The insecticide dispensing device of claim 11, wherein the attractive toxic sugar bait undergoes fermentation when activated by water and releases carbon dioxide.

14. A method of dispensing insecticide comprising steps of:
providing an insecticide dispensing device, the insecticide dispensing device including:
a housing including an outer surface and an inner surface that defines an internal cavity, the housing including a cap;
an attractive toxic sugar bait; and
at least one aperture in the housing that extends from the outer surface to the inner surface and forms a pathway from the internal cavity out of the housing, the at least one aperture being located to allow a gaseous compound to exit the internal cavity and sized to allow a target insect to access the attractive toxic sugar bait;
activating the attractive toxic sugar bait by adding a quantity of water to the attractive toxic sugar bait in the device; and
placing the insecticide dispensing device in a vertical or substantially vertical orientation in an area where insects are present.

15. The method of claim 14, wherein the water has a temperature of at least about 70° F.

16. The method of claim 14, wherein the step of adding water to the attractive toxic sugar bait creates an attractive toxic sugar bait solution having the insecticide agent present in an amount from about 0.05% by weight to about 5% by weight of the attractive toxic sugar bait solution.

17. The method of claim 14, further comprising a step of leaving the insecticide dispensing device in place for a period of up to about 90 days.

18. The method of claim 14, wherein the step of activating includes initiating a fermentation reaction that releases carbon dioxide.

\* \* \* \* \*